July 14, 1936. A. RIEBE 2,047,885
JOURNAL BEARING
Filed Jan. 31, 1934 4 Sheets-Sheet 1
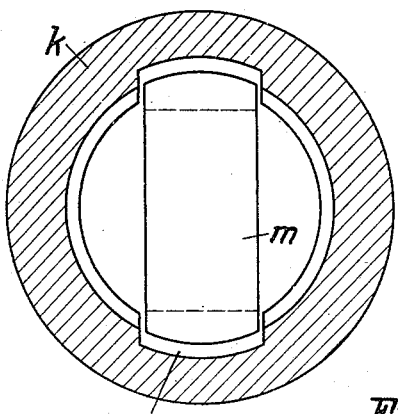
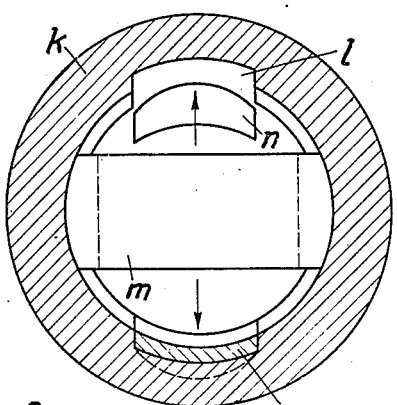
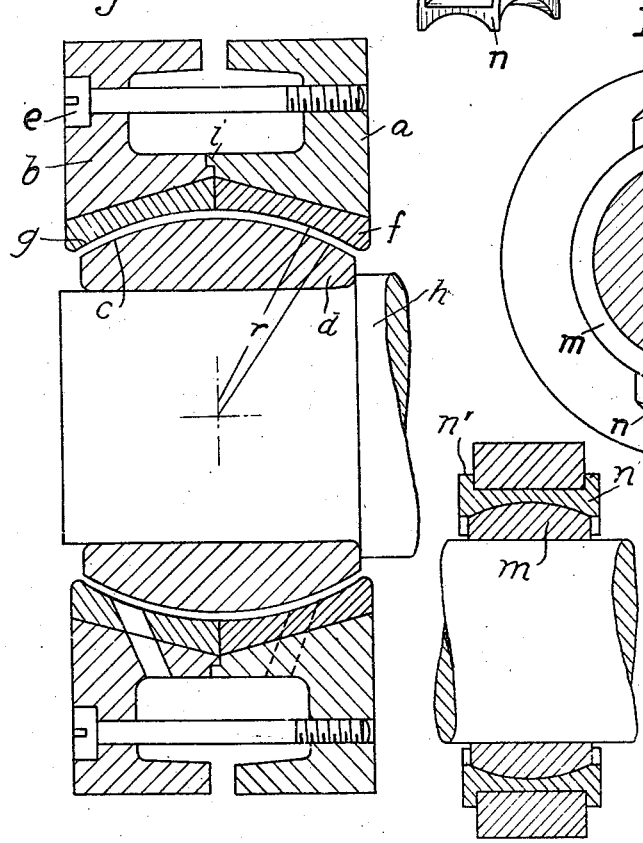
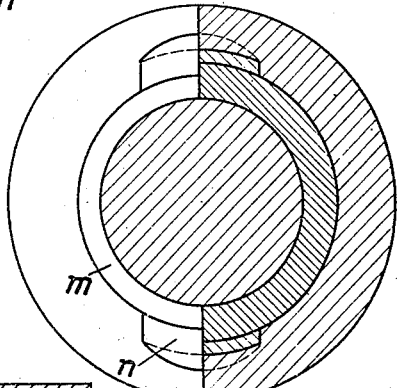
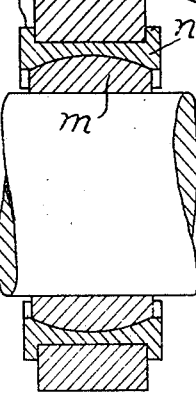
Inventor:
A. Riebe July 14, 1936.  A. RIEBE  2,047,885
JOURNAL BEARING
Filed Jan. 31, 1934  4 Sheets-Sheet 3

Inventor:
A. Riebe
By Marks &Clerk
Attys.

July 14, 1936. A. RIEBE 2,047,885
JOURNAL BEARING
Filed Jan. 31, 1934 4 Sheets-Sheet 4

Inventor:
A. Riebe
By: Marks & Clark
Attys.

Patented July 14, 1936

2,047,885

UNITED STATES PATENT OFFICE 2,047,885

JOURNAL BEARING

August Riebe, Berlin-Schmockwitz, Germany

Application January 31, 1934, Serial No. 709,209
In Germany February 8, 1933

13 Claims. (Cl. 308—29)

Journal bearings are known of which the sliding surfaces of the shaft and of the bushing are formed spherically, these bearings having a slightly greater radius for the spherical surface of the bushing than for the one of the shaft in order to provide for the necessary space for the lubricant. Theoretically those spherical surfaces will touch each other only at one point as all spherical surfaces of different radius do and practically the contact between these surfaces will also be very small, even if the elastic deformation is taken in account.

Therefore, as experience has shown, the bearing capacity of these bearings is very low, as high pressure will occur at the contact place which easily leads to an interruption of the oil layer.

The present invention relates to bearings for which these drawbacks have been avoided by giving the spherical surfaces a special form and by providing special lubricating devices and means for assembling the parts of these bearings in a special appropriate line.

Figure 10:
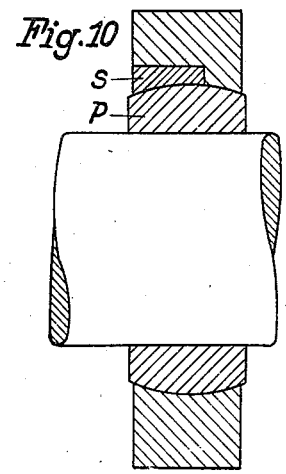
Figure 11:
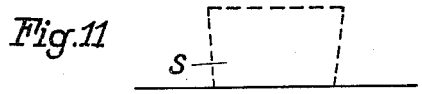
Figure 12:
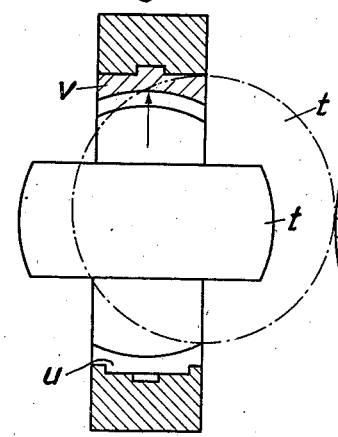
Figure 14:
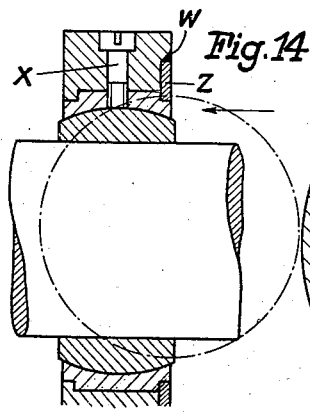
Figure 15:
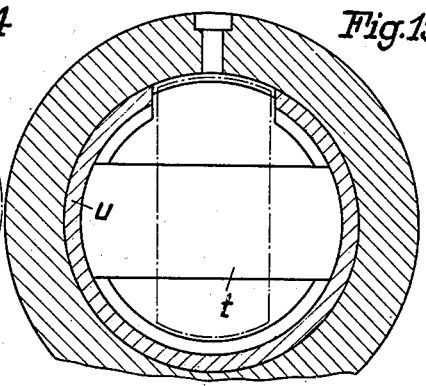
Figure 16:
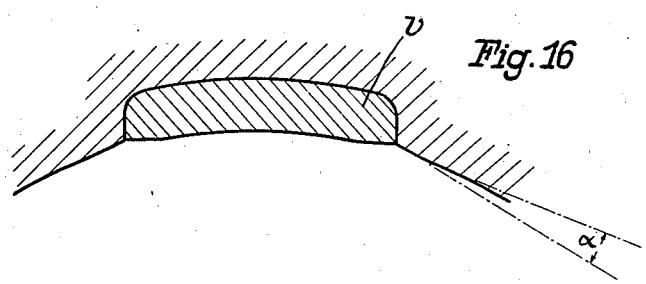
Figure 17:
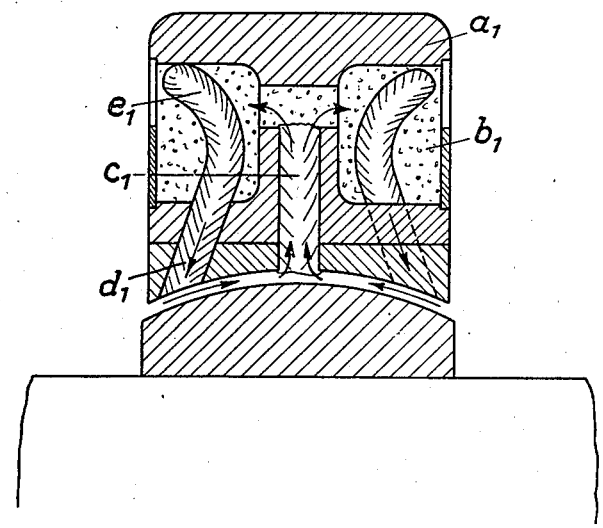
Figure 18:
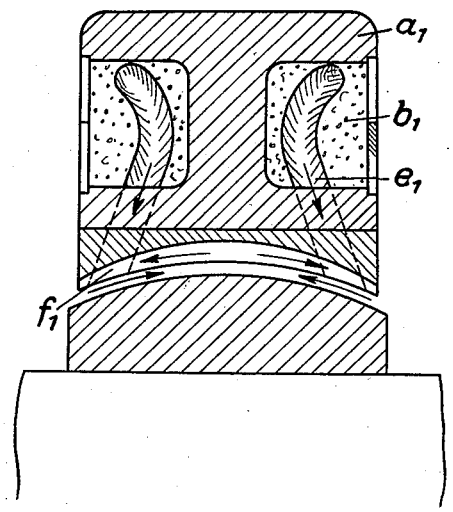
Figure 19:

Fig. 1 is a cross-section of the bearing, the shaft being shown in elevation,

Figs. 2 to 5 are views partly in cross-section showing the steps of assembling the bearing, Fig. 6 is a perspective view of a fill-in piece used in the bearing, Figs. 7 to 10 are views showing the steps of assembling the bearing in another modification, Fig. 11 is a plan view of the fill-in piece in the latter modification, Figs. 12 to 15 are views showing the steps of assembling the bearing in another modification, Fig. 16 is a partial cross-section showing a preferred form of the gap in the cage, Fig. 17 is a partial cross-sectional view of the lubricating arrangement, Figs. 18 and 19 are similar views showing a modified form of the same.

According to the invention the sliding surfaces of these bearings are arranged in such a way that the curve ($g$ in Fig. 1) which produces the sliding surface of the bushing by rotating round the axis of the bearing, is equal, in the direction of the axis of the bearing, in all respects to the curve ($c$ in Fig. 1) producing the sliding surface of the journal. In order to form the rotation bodies, representing the sliding surfaces of the bearing, the curves are turned round the axis of the bearing with different radii, these radii differing by the thickness of the oil layer provided the bushing and the journal are arranged concentrically to each other.

If, for example, a journal formed according to the invention will come to rest upon the bushing while the shaft is not moving, it, theoretically, will touch the bushing in a line and not only in a point as mentioned above, this line lying in the direction of the axis of the bearing; in this case the lines $c$ and $g$ of Fig. 1 will completely cover each other. As practically a certain deformation occurs the journal will find a rather great supporting area which means a greater bearing capacity of the bearing eliminating almost completely the danger of an interruption of the oil layer.

The curves $c$ and $g$, producing the two sliding surfaces, may have any form. For example they may have the shape of a barrel. Fig. 1 shows them as arcs having the radius $r$.

In order to make possible an assembling of the bearing, the bearing shown in Fig. 1 consists of two parts $a$ and $b$ which are held together by bolts $e$. The bushing $f$ also consists of two parts. The two halves of the cage are centered by means of a projecting collar-piece $i$ formed on one of said halves. The sliding surface of the journal is formed by an annular member $d$ which sits tight against a collar located upon the cylindrical shaft $h$.

By dividing up the cage into two parts, as described above, the stability of the bearing will be decreased and the costs for manufacturing same will be raised. It therefore is part of the invention to furnish a cage into which the annular member may be inserted without dividing up the cage either longitudinally or vertically. For this purpose the outer part of the cage is formed of a sole piece.

This one part cage has a much higher stability than a cage consisting of two parts which must be kept together by connecting means. For this reason such a cage shows great advantages especially for bearings which have to withstand great stresses and vibrations as well in radial as in axial direction. Besides this the manufacturing costs will be lower for a bearing of this kind than for a bearing consisting of several parts as every centering and screwing together is avoided.

These considerations lead to a one part cage in which openings or slots are provided or cut out to allow the insertion of the annular member, these openings then being closed by means of fill-in pieces. These fill-in pieces rest with their outer part against the rigid cage whereas their inner side has the shape of the sliding surface. The fill-in pieces are kept in place by means of fish plates, bolts or by soldering, welding or melting them in. Fill-in pieces of this kind will not decrease the bearing capacity of the bearing nor will they trouble the forming of an oil layer between the sliding surfaces.

In the cage $k$ shown in Fig. 2, two openings lying opposite each other and extending over the whole length of the cage are cut out from the cage $k$, the width of these openings corresponding to the length of the annular member $m$. Fig. 2 shows the annular member in its insertion position. In Fig. 3 the annular member has been turned into the horizontal position, thus giving free the insertion openings. Then, as shown in the upper part of Fig. 3, the fill-in pieces may be inserted in the cage $k$ and then they may be pushed into the openings, in the direction indicated by the arrow, so that they take the place shown in the lower part of the same figure.

Then the annular member is turned into its final position, the bearing being now ready for the insertion of the shaft. Fig. 4 shows the complete bearing in longitudinal section and Fig. 5 shows the same bearing in cross section.

Fig. 6 is a perspective view of a fill-in piece $n$. The lower surface of this piece corresponds exactly to the spherical sliding surface and its upper surface fits tight against the cage $k$. A lateral motion of this piece is prevented by means of cheeks located at both sides of the fill-in piece.

Figure 7:
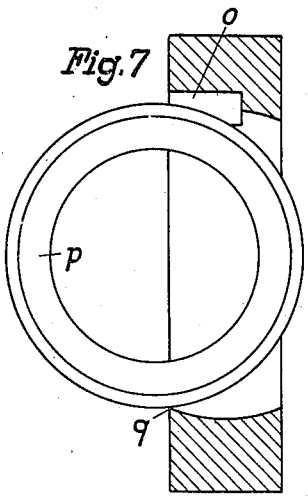
Figure 8:
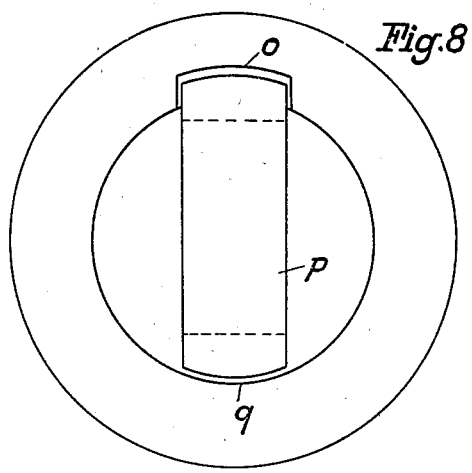
Figure 9:
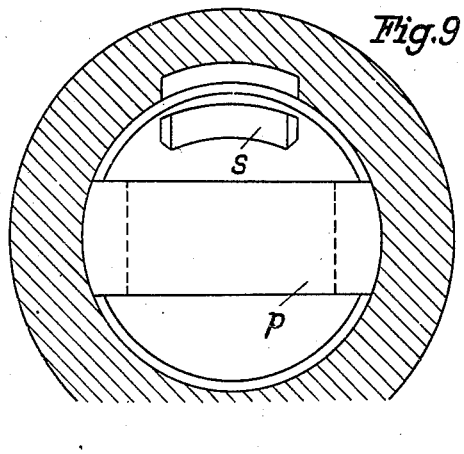

For short bearings with a narrow annular member or for bearings with a rather great cage, one opening will be sufficient for introducing the curved annular member. As Figs. 7 and 8 show the slot $o$ extends a little over half the length of the bearing, this slot being so deep that the annular member can be lifted over the edge $q$ situated opposite the slot $o$. After turning the annular member through an angle of 90°, as shown in Fig. 9, the fill-in piece $s$ is inserted radially. In order to keep this piece from moving in the longitudinal direction of the bearing, it is advantageous to give it a dovetailed shape as shown in Fig. 11. As Fig. 10 shows the annular member will then be turned to its working position, the fill-in piece being secured in its place by the annular member.

The insertion openings shown in Figs. 2 to 11 have been cut out of the solid cage. The bearings may also be designed in such a way that a bushing of a bearing metal of any kind is provided in the cage. For bearings of this kind it is advantageous to form the insertion slots by leaving out parts of the bushing at places lying opposite each other, these left out parts being filled out by corresponding fill-in pieces after the annular member has been inserted into the bushing.

Figure 13:
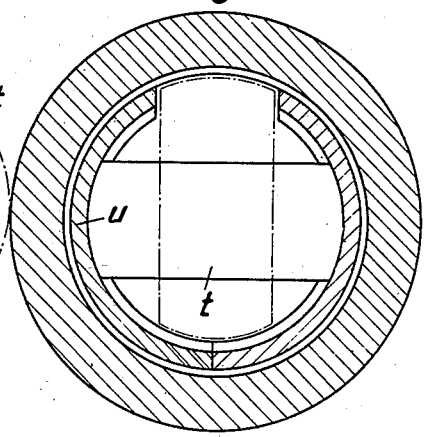

Figs. 12 to 15 show cages with only one slot for inserting the annular member. With these cages the annular member is put in through the slot, located in the bushing $u$ as indicated by dotted lines; then it is turned to its horizontal position. When this is done the fill-in pieces $v$ of Fig. 12 may be pushed in radially as indicated by the arrows. This piece is then held in position, in the same way as the bushing, by means of milled out grooves. As Fig. 13 shows the bushing $u$ may be divided up at its lower part in order to facilitate its insertion into the cage.

The modifications shown in Figs. 14 to 15 do not need this dividing up, as the bushing is pushed into the cage in the same way as the fill-in pieces, i. e. sideways in the direction of the arrows. The bushing is kept from axial movement by means of a ring $z$ with a welding seam $w$ or by any other fastening means. The screw $x$ holds the fill-in piece in the radial direction, it pulls this piece outward in order to maintain the necessary space for the oil layer. The fill-in pieces may also be fixed in any other suitable way to keep them from moving in either radial or axial direction. The openings or slots may also be filled out by casting in or injecting bearing metal of any kind. This proceeding will be of special advantage, if different metals are selected and used in order to improve the sliding qualities of the bearing. For example the fill-in pieces may consist of graphitic metal or the openings or slots may be filled out with such a metal.

In order to avoid an unfavourable effect of the gap at the joints between the fill-in pieces and the sliding surface of the bearing, the edges of these gaps are cut off. According to the invention an angle $\alpha$ of 10 to 20° between the cut-off edge and the tangent has been chosen, as Fig. 16 shows in which $v$ is the fill-in piece, in order to avoid breaking-off of the oil layer at these places. By this means the forming of turbulent flows within the oil layer will also be avoided.

In most cases it will be advantageous to make the openings or slots of these bearings as small as possible in order to get, as far as possible, a uniform sliding surface. According to the invention the openings may be made smaller than the annular member to be inserted would require, if the insertion of these angular members is made possible by other means. For example this may be done by deforming the annular member elastically when inserting it. The annular member will then take back its original form after it has been inserted. The elastic deformation may be kept very small by heating the cage of the bearing or by cooling-off the annular member. Both proceedings may also be used at the same time in which case a deformation will eventually not be necessary.

In the drawings mentioned above the lubricating means are left out to make the drawings more clear. The bearing of the invention is specially adapted for providing the necessary lubricating means, which are shown, on a larger scale, in Figs. 17 to 19. For these lubricating means the following considerations were carried through:

When the journal of the bearing is rotating, the oil tends to flow, under the influence of the centrifugal force, to the point of the greatest radius, i. e. to the middle of the sliding surface of the bearing. This is advantageous as a loss of oil at the sides of the bearing is avoided, but the oil will stagnate in the middle of the bearing and be overheated at this point by friction, thus losing its lubricating ability.

According to the invention the lubricant reservoir $b_1$, provided within the body of the bearing $a_1$, is interconnected, by one or more holes $c_1$, with the centre part of the sliding surface, whereas other openings $d_1$ lead from the lubricant reservoir $b_1$ to the outer parts of same. In this way a complete oil circulation is obtained: The oil starts at the reservoir $b_1$, passes through the openings $d_1$ to the outer part of the sliding surface, flows over the sliding surface to the middle of the bearing and back to the lubricant reservoir by way of the openings $c_1$, as indicated by the arrows in Fig. 17.

In order to avoid flowing out too fast of the oil through the openings $c_1$, wicks or other means for throttling the flow of the oil may be provided in this opening. In the openings $d_1$ also wicks are provided to bring the oil back to the sliding surface.

The whole oil reservoir $b_1$ may also be filled with wicks or other oil accumulating material. This material will then suck-up oil from the outside, for example from an oil sump in which the bearing is immersed, this oil being fed to the sliding surfaces by way of the wicks $e_1$.

Figs. 18 and 19 show another arrangement for obtaining an oil circulation. In this case a groove chiefly rectangular to the sliding surface has been provided, in which the oil is not submitted so much to the centrifugal force. Through this groove the oil flows to the outer part of the sliding surface, as indicated by the arrows in Fig. 18. By varying the depth of the cross groove, the flow of the oil may be regulated as desired. The groove may also be made more shallow towards the outside of the sliding surface in order to avoid loss of oil at the sides of the bearing.

Bearings as described above are not only able to take up lateral pressure, but even a deflection or inclination of the shaft will not lessen their bearing capacity. On account of this the edge pressure will be absolutely avoided which, in connection with the good lubricating ability, makes this bearing specially adapted for taking up very great leads. For this reason it is possible to shorten the length of the bearing considerably, so that journal bearings may be obtained the outside dimensions of which do not exceed those of a ball bearing with the same bearing capacity. It is of special advantage to give the outside of the bearing a cylindrical shape so that bearings of the invention may take the place of ball bearings and be built-in into machines of all kinds.

What I claim and desire to secure by Letters Patent is:—

1. A journal bearing of short length adapted to be built-in into bearing casings, comprising an outer cage with a curvilinearly formed sliding surface of revolution at its inner side, an annular member adapted to be put upon the shaft and having a curvilinearly formed sliding surface, said sliding surfaces having the contour which would be outlined by rotation of curves round the axis of the bearing, said curves being equal in every respect in the direction of the axis of the bearing and the rotation radius of said curves differing by the thickness of the oil layer, the cage and the journal being arranged concentrically to each other, cut-outs permitting the insertion of said annular member in said cage, and means adapted to produce an oil circulation when the journal is rotating.

2. A journal bearing of short length adapted to be built-in into bearing casings, comprising an outer cage with curvilinearly formed sliding surfaces of revolution at its inner side, an annular member adapted to be put upon the shaft and having a curvilinearly formed sliding surface, said sliding surfaces having the contour which would be outlined by rotation of curves round the axis of the bearing, said curves being equal in every respect in the direction of the axis of the bearing and the rotation radius of said curves differing by the thickness of the oil layer, the cage and the journal being arranged concentrically to each other, said outer cage consisting of a sole piece provided with two openings or slots lying opposite each other, fill-in pieces adapted to close the openings of said cage after the annular member has been inserted, said fill-in pieces having the shape of the sliding surface at their side corresponding to the annular member, means for holding said fill-in pieces in place, and means adapted to produce an oil circulation when the journal is rotating.

3. A journal bearing of short length adapted to be built-in into bearing casings, comprising an outer cage with curvilinearly formed sliding surface at its inner side, an annular member adapted to be put upon the shaft and having a curvilinearly formed sliding surface, said sliding surfaces having the contour which would be outlined by rotation of curves round the axis of the bearing, said curves being equal in every respect in the direction of the axis of the bearing and the rotation radius of said curves differing by the thickness of the oil layer, the cage and the journal being arranged concentrically to each other, said outer cage consisting of a sole piece provided with two openings or slots lying opposite each other, said openings extending over half the length of the bearing, fill-in pieces adapted to close the openings of said cage after the annular member has been inserted, these fill-in pieces having the shape of the sliding surface at their side corresponding to the annular member, means for holding said fill-in pieces in place and means adapted to produce an oil circulation when the journal is rotating.

4. A journal bearing of short length adapted to be built-in into bearing casings, comprising an outer cage with curvilinearly formed sliding surface at its inner side, an annular member adapted to be put upon the shaft and having a curvilinearly formed sliding surface, said sliding surfaces having the contour which would be outlined by rotation of curves round the axis of the bearing, said curves being equal in every respect in the direction of the axis of the bearing and the rotation radius of said curves differing by the thickness of the oil layer, the cage and the journal being arranged concentrically to each other, said outer cage consisting of a sole piece provided with two openings or slots lying opposite each other, fill-in pieces adapted to close the openings of said cage after the annular member has been inserted, these fill-in pieces having the shape of the sliding surface at their side corresponding to the annular member, means for holding said fill-in pieces in place, said fill-in pieces having a dovetailed shape by which means they are kept from moving in axial direction, and means adapted to produce an oil circulation when the journal is rotating.

5. A journal bearing as described in claim 1 characterized by the fact that a bushing is provided in the outer cage of the bearing, said bushing consisting of bearing metal and having openings which are formed by recesses in the bearing metal bushing, and that the fill-in pieces correspond to said openings.

6. A journal bearing as described in claim 1 characterized by the fact that the fill-in pieces consist of other metal than the sliding surfaces.

7. A journal bearing as described in claim 1 characterized by the fact that the edges of the gaps of the joints between the sliding surface and the fill-in pieces are cut-off forming an angle of not more than 10 to 20° towards the tangent at this point.

8. A journal bearing as described in claim 1 characterized by the fact that the annular member is elastically deformed when it is inserted in the cage of the bearing.

9. A journal bearing of short length adapted to be built-in into bearing casings and having curvilinearly formed sliding surfaces, comprising an outer cage with a curvilinearly formed sliding surface at its inner side, an annular member adapted to be put upon the shaft and having a curvilinearly formed sliding surface, said sliding surfaces being formed by rotation of curves round the axis of the bearing, said curves being equal in every respect in the direction of the axis of the bearing and the rotation radius of said curves differing by the thickness of the oil layer, the cage and the journal being arranged concentrically to each other, means adapted to insert said annular member in said cage, said cage being provided with an oil reservoir connected with the part of greatest diameter of the bearing by means of one or more holes and connected with the part of smallest diameter by other holes.

10. A journal bearing of short length adapted to be built-in into bearing casings and having formed sliding surfaces, comprising an outer cage with curvilinearly formed sliding surface at its inner side, an annular member adapted to be put upon the shaft and having a curvilinearly formed sliding surface, said sliding surfaces being formed by rotation of curves round the axis of the bearing, said curves being equal in every respect in the direction of the axis of the bearing and the rotation radius of said curves differing by the thickness of the oil layer, the cage and the journal being arranged concentrically to each other, said cage being provided with an oil reservoir connected with the part of the smallest diameter of the sliding surfaces by holes and a cross groove approximately in the direction of axis of the bearing leading from the part of greatest to the part of smallest diameter.

11. A journal bearing of short length adapted to be built-in into bearing casings, comprising an outer cage with curvilinearly formed sliding surface at its inner side, an annular member adapted to be put upon the shaft and having a curvilinearly formed sliding surface, said sliding surfaces being formed by rotation of curves round the axis of the bearing, said curves being equal in every respect in the direction of the axis of the bearing and the rotation radius of said curves differing by the thickness of the oil layer, the case and the journal being arranged concentrically to each other, said cage being provided with an oil reservoir filled with oil absorbing material and wicks connecting said reservoir and with the oil located in an oil sump into which the bearing is immersed.

12. A journal of short length comprising an outer cage with a curvilinearly formed sliding surface of revolution at its inner side, an annular member adapted to fit upon the shaft of the bearing and extending into the inner bearing surface, the inner and outer bearing surfaces being of the forms generated respectively by two arcs of equal radius spaced slightly apart radially and revolved about the axis of the bearing.

13. The device as claimed in claim 9, in which wicks are placed in said holes.

AUGUST RIEBE.